United States Patent [19]

Mitchell

[11] Patent Number: 5,596,318

[45] Date of Patent: Jan. 21, 1997

[54] METHOD FOR OPERATING A TWO-WAY MESSAGING SYSTEM TO EXTEND BATTERY LIFE

[75] Inventor: Edward E. Mitchell, Issaquah, Wash.

[73] Assignee: Microsoft Corporation, Redmond, Wash.

[21] Appl. No.: 372,187

[22] Filed: Jan. 12, 1995

[51] Int. Cl.⁶ .................................................. H04Q 7/18
[52] U.S. Cl. .................. 340/825.44; 340/825.47; 370/394; 455/53.1; 379/58
[58] Field of Search .................. 340/825.44, 825.47, 340/825.52, 825.54; 370/94.1; 455/186.1, 33.1, 53.1; 379/57, 58

[56] References Cited

U.S. PATENT DOCUMENTS

| | | | |
|---|---|---|---|
| 4,644,351 | 2/1987 | Zabarsky et al. | 340/825.52 X |
| 5,005,014 | 4/1991 | Jasinski | 340/825.54 X |
| 5,315,635 | 5/1994 | Kane et al. | 340/825.44 X |
| 5,396,537 | 3/1995 | Schwendeman | 340/825.44 X |
| 5,459,457 | 10/1995 | Sharpe | 340/825.44 |
| 5,463,382 | 10/1995 | Nikas et al. | 340/825.44 |

OTHER PUBLICATIONS

Tananbaum, Andrew S., *Computer Networks*, 2d edition, 1988, Section 4.4.
SkyTel Developer's Program Specification (Including Prelim. NewStream Interface Spec. Rev. 1/7), Jul. 30, 1992.
*A Standard Code for Radiopaging*, "A Report of the Studies of the British Post Office Code Standardisation Advisory Group (POCSAG)", British Post Office, Jun. 1978, pp. 1–40.
*Telocator Data Protocol* (TDP), Personal Communications Industry Association, Jun. 12, 1993.

*Primary Examiner*—Michael Horabik
*Assistant Examiner*—William H. Wilson, Jr.
*Attorney, Agent, or Firm*—Jones & Askew

[57] ABSTRACT

A priority based protocol for a two-way paging system improves the life expectancy of the pager's battery by minimizing use of pager's transmitter, without significantly impacting the reliability of the system or the timeliness of message delivery. This is accomplished by eliminating the need to always sends acknowledgments of received messages and by piggybacking acknowledgments and messages together in a single transmission. In the priority based protocol, high priority messages are immediately acknowledged by the pager. All messages include a message sequence number. When a non-critical message is received by a pager, it checks the message sequence numbers of earlier messages to determine whether an earlier message is missing. If so, the pager sends to the paging network a request to resend the missing message. In order to ensure that non-critical messages are received within a predetermined period of time, the network sends a ping packet indicating message sequence number that will be assigned to the next message. This is used by the pager to check for missing messages. Low priority transmissions from the pager to the network are combined with other messages in order to reduce the use of the pager's transmitter.

29 Claims, 9 Drawing Sheets

TWO-WAY MESSAGING SYSTEM

T = Network Transmitter
P = Pager
R = Network Receiver

TWO-WAY MESSAGING SYSTEM

T = Network Transmitter
P = Pager
R = Network Receiver

METHOD FOR OPERATING A TWO-WAY MESSAGING SYSTEM TO EXTEND BATTERY LIFE

TECHNICAL FIELD

The present invention relates to two-way paging systems, and more particularly relates to a priority-based protocol for extending the life of a battery in a two-way messaging unit.

BACKGROUND OF THE INVENTION

For some time, conventional paging services have been able to transmit one-way, unacknowledged messages to small battery powered receiving units, which are commonly known as pagers or beepers. Pagers are typically used by people who need to be able to receive messages when they are away from their home or office. To accommodate those who need to receive messages when traveling outside their local area, paging companies also provide regional and national paging services.

Basic paging services utilize numeric pagers, which are designed to receive and display a series of numbers. In most cases, the numbers are entered by the person calling the pager, and indicate the telephone number that the paging customer should call in order to respond to the page. More sophisticated paging services accommodate alphanumeric pagers, which are capable of receiving and displaying short messages that include a series of alphabetic and/or numeric characters. These are especially useful for physicians, salespeople, and others who need or want to receive information in addition to the simple telephone numbers displayed by numeric pagers.

Recent technology has also provided pagers, or more precisely, message receivers, that can be plugged directly into personal computers (PCs). These message receivers allow PCs to receive brief electronic mail messages and other types of information, including non-priority messaging such as news and weather. The messages may be displayed on the computer's display and/or stored for future use.

One obstacle associated with one-way paging networks is that the pagers are "receive only" devices and, as such, cannot transmit a message to the sender acknowledging receipt of the message. Because the messages cannot be acknowledged, paging networks include several features that improve the reliability of message delivery by increasing the likelihood that a pager will accurately receive its messages. These features include using simultaneous, high powered transmissions from multiple, in-phase transmitters, and sending messages more than once. For one-way short message transmission, paging companies claim reliable message delivery rates of up to 99%.

In order to further improve reliability, some paging networks also include a message sequence number with the transmitted message. The pager displays the message sequence number along with the message. If the user notices a gap in the sequence numbers of recently received messages (e.g., [01], [02], [04], [05], where [03] is missing), the user can manually dial the paging network over a telephone and request that the missing page or pages be retransmitted.

Inasmuch as pagers are used to allow communication with a person who is away from their home or office, paging devices must operate from batteries. Because batteries have a finite life, measures have been taken to extend the battery life, therefore, extending the amount of time a pager can operate without replacing or recharging its battery. An advantage of one-way paging is that because the pager is "receive only" and does not transmit messages, the battery in the pager lasts a relatively long time (perhaps a month or more, depending on the number of messages received).

Current one-way paging protocols attempt to conserve battery power by allowing pagers to spend most of their time in a sleeping or idle state. An example of such a protocol is the Post Office Code Standardisation Advisory Group (POCSAG) protocol for the delivery of one-way messages from the paging network to the pager, which was defined by the British Post Office and adopted as an industry standard.

The POCSAG protocol provides for battery savings by combining eight data frames into a single batch for transmission, and by enabling the receiver to occasionally sample the radio frequency rather than doing so continuously. In the POCSAG protocol, each transmission begins with a preamble, called the synchronization word. The preamble consists of at least 576 bits containing a special sequence of ones and zeros, which are sampled by the pager and used to synchronize the pager to the paging network. The synchronization word is followed by one or more batches of messages. Within each batch are eight frames numbered from 0 to 7. Each pager is assigned to one of the frame slots and need only listen to its specific frames slot within a batch of messages.

When a pager is first turned on, it looks for a synchronization word from the paging network. During its idle mode, the pager turns on every few seconds to receive one word of data per batch at the time a synchronization word is expected to be heard, based on the last reception of a synchronization word. When the synchronization word is detected, the pager decodes the addresses within the appropriate frame of the batch. If its address is present, the pager proceeds to decode the following message and then returns to the idle mode, until the time when the next synchronization word is expected. If no message is destined for the pager, the pager goes back to sleep. Every eight batch periods, the receiver switches on for one complete batch to ensure that it is properly synchronized. This allows the pager to recover from a temporary loss of signal from the network. In essence, the primary battery conservation measures employed in a one-way paging network using the POCSAG protocol is to keep the pager in an idle or sleeping mode whenever possible.

The Federal Communications Commission (FCC) has recently released a portion of the radio spectrum for Narrowband Personal Communications Services (PCS). With the release of this radio spectrum, the FCC has auctioned ten nationwide paging channels, some of which are paired, and some of which are not. In either case, paging service providers intend to use many of these channels to provide two-way paging services. In a two-way paging system, the pager includes not only a paging receiver but a small packet radio transmitter that is able to send short messages from the pager back to the paging network.

The presence of the transmitter in the pager makes it possible for the pager to positively acknowledge receipt of each message by transmitting a signal back to the paging network. If the network does not receive confirmation of message receipt by the paging recipient, then the network may be configured to transmit the message again. Further, the reverse channel, from the pager to the network, can also be used to send short electronic mail messages from the pager to the network, which forwards the message to the intended recipient.

However, once a transmitter is incorporated into a pager, and the two-way pager begins to transmit data, the pager's battery life will be reduced due to the power consumed by the transmitter. If two-way paging systems utilize protocols similar to those used in conventional two-way packet radio networks, the pagers will acknowledge each message that is received from the paging network. This means that when a message is received by the pager, the two-way pager transmits a short data burst back to the paging network indicating that message was received (or perhaps garbled, requiring a retransmission). Although acknowledging each message enhances the reliability of the paging system, the transmission of the acknowledgment will decrease the battery life of the two-way pager. Indeed, acknowledged paging could drastically reduce the 30 day battery life of today's pagers down to less than one week for two-way pagers (depending upon the traffic load delivered to the pager).

The reduction in battery life is even more severe when a two-way paging unit is used in conjunction with portable or hand held computers. For example, existing handheld computers may have battery lives of 4 to 8 hours. However, when a radio transmitter is connected to the computer, the battery life could be significantly reduced. Therefore, there is a need in the art for a method of improving battery life expectancy for two-way pagers, including a method for operating a two-way messaging system in order to reduce the use of the pager's transmitter whenever possible, without significantly impacting the reliability or timeliness of message delivery.

In addition, the unnecessary transmission of administrative or overhead messages decreases the effective capacity of the network. Therefore, there is a need in the art for a method for operating a two-way messaging system in order to minimize the amount of air time devoted to sending administrative messages back and forth, thereby increasing the effective capacity of the network and potentially lowering any air time charges billed to the user.

SUMMARY OF THE INVENTION

The present invention satisfies the previously described needs by providing a priority-based protocol for a two-way paging system. The protocol, which is based on the priority of each message, is useful to extend the life of two-way pager batteries by eliminating the need to send an acknowledgment after each message that is received from the paging system. The protocol also reduces the number of transmissions by piggybacking acknowledgments and messages together in a single transmission.

The method of the present invention is based on classifying messages by priority. The priority is used to determine if and when a pager needs to transmit a reply to the network. For urgent or priority messages, the pager will positively acknowledge each message. For non-priority messages, such as news, information and non-critical personal messaging, it is not essential that the message be reliably delivered immediately. A delay in the receipt of such messages is acceptable.

For non-critical messages, acknowledgments are handled by counting sequence numbers. When a two-way pager receives a message sequence number past the last number received, the pager requests the missing earlier pages. In order to ensure that non-critical messages are received within a predetermined amount of time, the paging network is used to periodically send a "ping" packet to each pager. The ping packet includes a new sequence number transmitted from time to time. Software running in the pager observes the incoming sequence numbers and transmits a data block to the network only when it determines that a previous message is missing. The result of using sequence numbers and ping packets is to increase battery life significantly for the two-way pager, enabling such devices to operate for longer periods of time without battery replacement or recharging, while continuing to provide reliable message delivery.

Generally described, the present invention provides a method for operating a message receiver that is operative for receiving data from and transmitting data to a message distribution network. The message receiver receives first and second messages from the message distribution network. The first and second messages include first and second message sequence numbers, respectively. The message receiver determines whether there is a missing message sequence number between the first and second message sequence numbers. If so, the message receiver transmits to the message distribution network a request to resend a message corresponding to the missing message sequence number.

More particularly described, the present invention provides a method for operating a message receiver, which receives data from and transmits data to a message distribution network. The message receiver receives a plurality of messages from the message distribution network. Each of the messages includes a message sequence number corresponding to the order in which the messages were transmitted by the message distribution network. When the message receiver receives a subsequent message, which includes a message sequence number, from the message distribution network, the pager determines whether the message sequence numbers indicate that a transmitted message has not been received by the message receiver. If so, the message receiver transmits to the message distribution network a request to resend a message corresponding to a missing message sequence number.

Still more particularly described, the message receiver of the present invention is capable of storing a reply to one of the plurality of messages and incorporating the reply into an acknowledgment of a high priority message. Prior to receiving the missing message in response to its request, a message receiver embodying the present invention is also capable of determining whether a predetermined amount of time has elapsed since the request to resend the message was transmitted and if so, retransmitting the request to resend the missing message.

In another aspect, the present invention provides a method for operating a message distribution network, which is operative for transmitting data to and receiving data from a message receiver. The message distribution network transmits first and second messages to the message receiver. The first and second messages include first and second message sequence numbers, respectively. Subsequent to transmitting the second message, the message distribution network receives from the message receiver a request to resend the first message. The message distribution network then retransmits the first message to the message receiver.

In another aspect, the present invention provides a two-way data messaging system that includes a message distribution network and a message receiver. The message distribution network is configured to transmit first, second and third messages, including first, second and third message sequence numbers, to the message receiver. The message receiver, which receives the first and third messages, is configured to use the message sequence numbers corresponding to the first and third messages to determine that the second message was not received, and to transmit a request to resend the second message. In response to the request, the message distribution network retransmits the second message to the message receiver.

In yet another aspect, the present invention provides a two-way data messaging system that includes a message distribution network and a message receiver. The message distribution network transmits a plurality of messages to the message receiver. Each of the messages includes a message sequence number corresponding to the order in which the messages are transmitted by the message distribution network. The message distribution network transmits a ping packet to the message receiver. The ping packet indicates the message number of the last message transmitted by the network to the pager. The message receiver receives the plurality of messages and the ping packet from the message distribution network, and determines whether at least one of the plurality of messages was not received. If so, the message receiver transmits a response requesting retransmission of the message corresponding to the missing message sequence number. The message distribution network receives the response requesting retransmission of the missing message and retransmits the missing message.

Still more particularly described, a messaging system embodying the present invention is capable of transmitting the ping packet after a predetermined amount of time has elapsed since the transmission of the last message. The predetermined amount of time may be determined by a priority level associated with the last message.

In another aspect, the present invention provides a two-way data messaging system including a message distribution network and a message receiver. The message distribution network transmits a plurality of messages, including message sequence numbers, to the message receiver. The message receiver receives the plurality of messages from the message distribution network and subsequently transmits a ping packet to the message distribution network. The message distribution network receives the ping packet and determines whether the ping packet corresponds to the last of the plurality of messages. If so, the message distribution network transmits an acknowledgment to the message receiver. If not, the message distribution network transmits the missing message to the message receiver.

In another aspect, the present invention provides a method for operating a message receiver which receives a plurality of messages, including message sequence numbers, from a message distribution network. The message receiver receives a ping packet, which identifies the last transmitted message, from the message distribution network. If the ping packet does not correspond to the last of the plurality of messages, the message receiver transmits to the message distribution network a request for a missing message.

It is therefore an object of the present invention to provide a method for operating a two-way paging network so as to conserve battery power.

It is another object of the present invention to provide a priority-based protocol that reduces the use of a two-way pager's transmitter without significantly impacting the reliability or timeliness of message delivery.

It is another object of the present invention to provide a priority based protocol in which the priority of the message determines how delivery of the message will be acknowledged.

It is another object of the present invention to provide a priority based protocol that eliminates the need to always acknowledge the receipt of messages from the network.

It is another object of the present invention to improve the effective capacity of the network by minimizing the transmission of low priority administrative data.

It is another object of the present invention to provide a protocol that utilizes a plurality of priority levels in order to determine the amount of time before a message will be acknowledged.

It is another object of the present invention to provide a priority based protocol that ensures immediate delivery of high priority messages.

It is another object of the present invention to provide a protocol that detects missing low-priority messages and requests retransmission of same.

DETAILED DESCRIPTION OF THE PREFERRED EMBODIMENT

Figure 1:
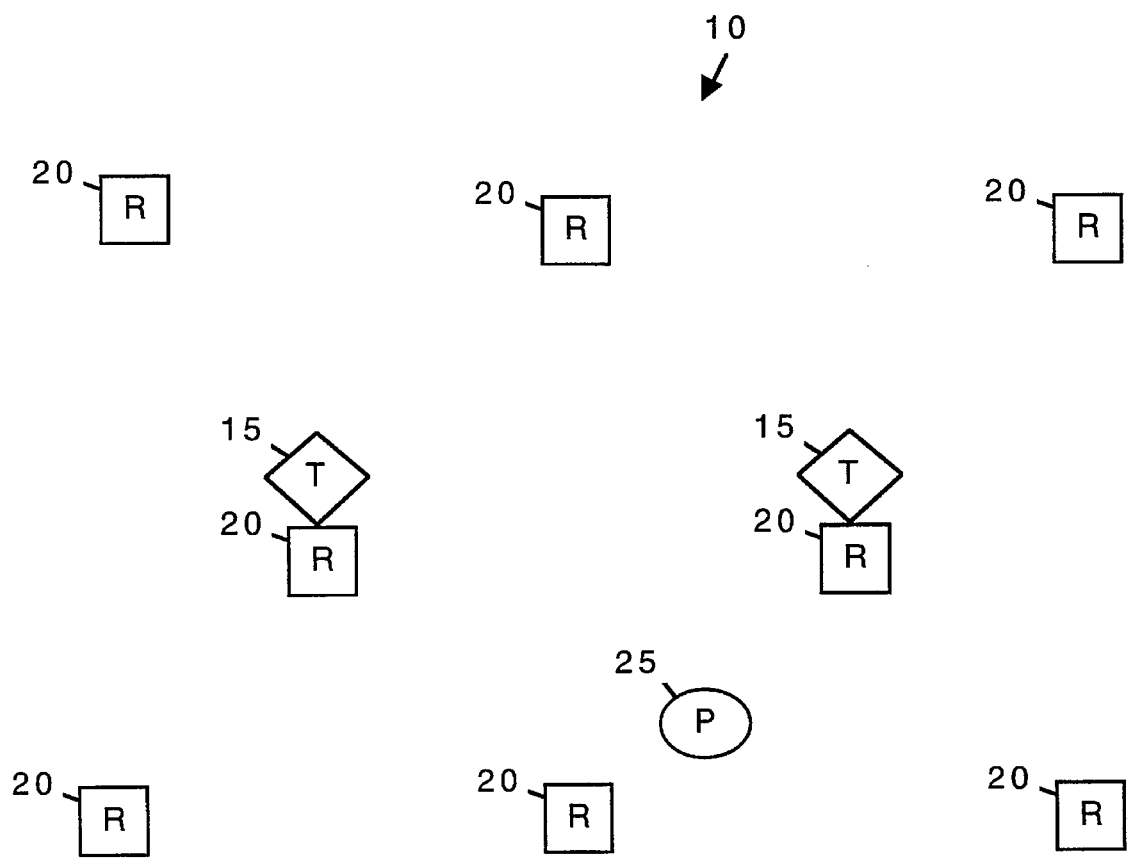
FIG. 1 is a diagrammatic illustration of a two-way paging system that includes a plurality of transmitters and receivers, and a pager.

Referring now to the drawings, in which like numerals represent like elements throughout the several figures, FIG. 1 is a diagrammatic illustration of a two-way message distribution network 10 that incorporates the priority based protocol of the present invention. The message distribution network 10 includes a plurality of transmitters 15 and a plurality of receivers 20. The message distribution network 10 communicates with a plurality of two-way message receivers or pagers, which are also capable of transmitting data to the network. For purposes of this specification, only one pager 25 is shown.

Generally described, the transmitters 15 transmit messages to the pager 25. Like the transmitters used in conventional one-way paging systems, the transmitters 15 are high powered, in-phase transmitters that simultaneously broadcast messages throughout the service area. The number and location of the transmitters 15 are selected to ensure that the service area is properly covered. Such considerations will be familiar to those skilled in the art.

The receivers 20 receive data transmissions from the pager 25. Because the transmitters used in the pagers are relatively weak (i.e., low power), the receivers 20 are more numerous than the transmitters 15, and are placed close enough to each other to ensure that a signal transmitted by a pager 25 will be able to reach at least one receiver 20 regardless of where the pager is located within the message distribution network 10. As described more completely below, the messages transmitted by the pager will typically include acknowledgments transmitted in response to messages from the network, and short electronic mail messages originating from the pager or prepared in response to earlier messages.

Figure 2:
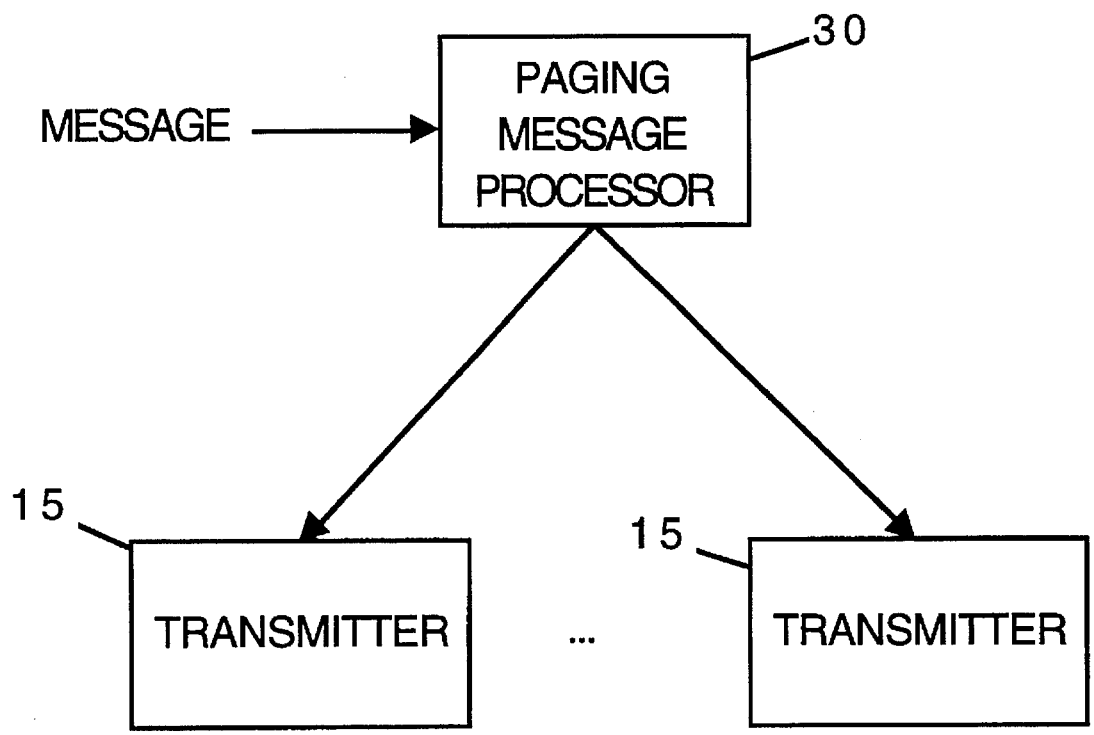
FIG. 2 is a diagrammatic illustration of a portion of the paging system of FIG. 1, including the components that control the input and transmission of messages.

FIG. 2 illustrates additional elements of the message distribution network 10. The preferred message distribution network is centrally controlled by a network operations center, which includes a paging message processor 30. Paging messages are originated by entering the message into the paging message processor 30, which accepts message input and queues messages for outgoing delivery to the appropriate transmitter sites.

Message input may be accomplished in any of several ways. In the case of numeric messages, a caller may use a telephone to dial a direct dial number that is associated with a single pager. When the network answers the call, the caller uses the telephone keypad to enter a return telephone number or other numeric code. Alternatively, a paging system may provide a single telephone number for all the pagers in the system. The particular pager that is being called and the return number or other numeric code are then entered by the caller using the telephone keypad. In both types of systems, the user will be asked to indicate the priority of the message.

Alphanumeric messages may be entered into the network using a message entry device such as a personal computer. After a message is composed on a personal computer, it may be transmitted to the network via modem. Alphanumeric messages may also be entered into the system by sending electronic mail to an address on a network (e.g., Internet) that is associated with a pager. The message will include an indication of its priority.

After the message is entered into the network, the paging message processor 30 determines where the message should be routed. If the system supports nationwide paging, the message is delivered to all transmitters across the country. If the subscriber is a local or regional subscriber, the message is delivered only to transmitters in the region where the subscriber has requested service. The network may deliver messages to remote transmitter sites via satellite links, leased lines, or other connections. Within a given region, the transmitters all send the message simultaneously. As mentioned above, this simultaneous transmission enables the pager to receive a strong signal from one or more transmitters.

Those skilled in the art will be familiar with the frequencies that are associated with one-way and two-way paging services. Many of the frequencies now in use for one-way paging systems are in the 150 MHz, 450 MHz and 930 MHz bands. Two-way paging services will be deployed primarily in the 930 MHz band using the Narrowband PCS frequencies that have been recently made available.

Those skilled in the art will also be familiar with various message formats and protocols that have been developed for use in paging networks. For example, The Personal Computer Industry Association (formerly Telocator) has published the Telocator Data Paging (TDP) Protocol Specification, which is incorporated herein by reference. This specification describes a suite of protocols that support wireless one-way binary data transmission from an input device to a remote computer device through radio paging systems. The Telocator Alphanumeric Protocol (TAP) is designed to provide off-line entry of paging information, which can then be uploaded to the paging network. Those skilled in the art will understand how existing message formats may be modified to include the additional data needed to implement the present invention.

Figure 3:
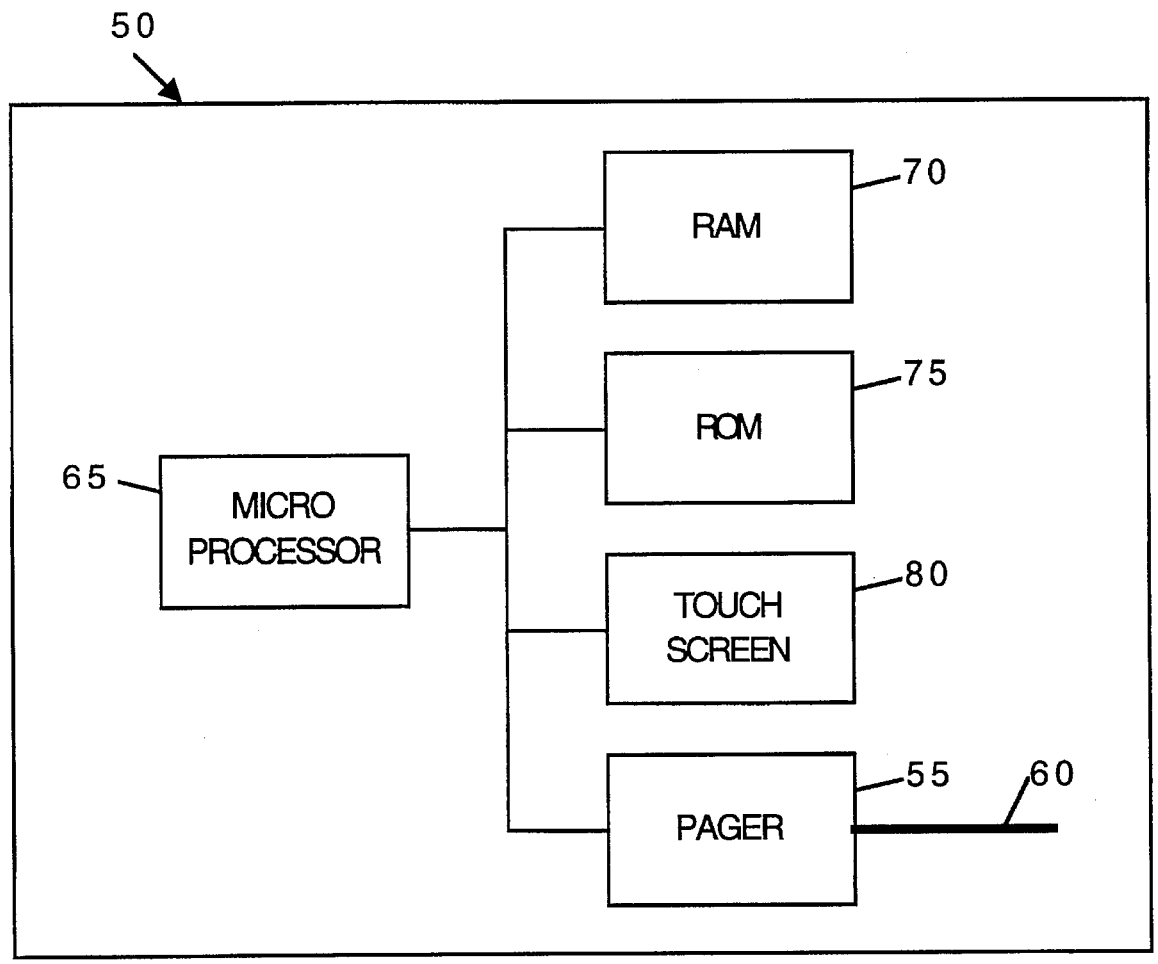
FIG. 3 is a block diagram of the circuitry employed in a hand held computer that includes a two-way pager.

In the two-way paging system 10 of FIG. 1, the preferred pager 25 is a hand held computer that includes a two-way message receiver. Such a device is illustrated in FIG. 3. The hand held computer 50 includes a two-way messaging or paging device 55. The paging device 55 includes an antenna 60, which may be internal or external. Those skilled in the art understand that, in addition to the paging device 55, the preferred hand held computer 50 includes a microprocessor 65, random access memory (RAM) 70, read only memory (ROM) 75, and a touch screen 80, which provides both a display and a touch sensitive keypad.

The priority based paging protocol, which is described below, and operating system and application programs are stored in the RAM 70 or ROM 75, and are executed by the microprocessor in a manner known to those skilled in the art.

TWO-WAY PAGING PROTOCOL

Turning now to FIGS. 4–7, the preferred priority based two-way paging protocol will be described. Those skilled in the art will appreciate that the paging protocol of the present invention minimizes the use of the pager's transmitter without significantly impacting the reliability or timeliness of message delivery. This is accomplished by taking advantage of the features of the paging network, such as simultaneous, high powered transmission by multiple in-phase transmitters. Inasmuch as these features were designed to ensure accurate message delivery in one-way, unacknowledged paging systems, they allow flexibility in the handling of non-high-priority messages in a two-way paging system.

The concepts employed in the priority based protocol of the present invention are best illustrated by discussing the protocol's methods for handling high priority messages and noncritical messages separately. These concepts are then combined to provide a two-way paging system that effectively acknowledges messages with different priorities, while maximizing the life of the pager's battery.

Those skilled in the art will understand that the priority based paging protocol of the present invention must be deployed in both the message distribution network and the pagers that are used in that network. Therefore, the principles of the present invention must be applied to write software that implements the features of the priority based protocol in both the network operating center and the individual pagers that are used in the paging system.

High Priority Messages

Figure 4A:
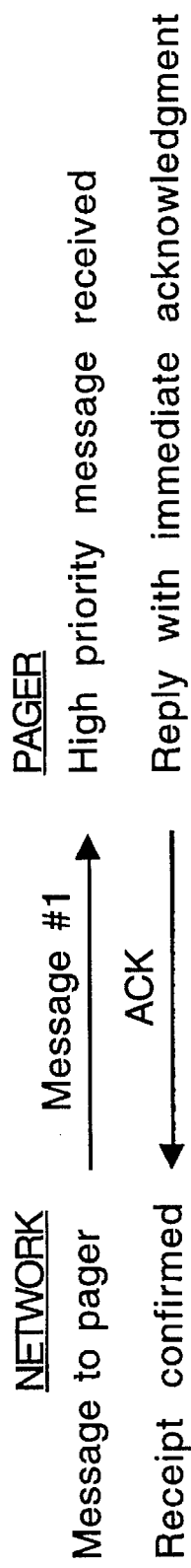
FIG. 4, consisting of FIGS. 4A, 4B and 4C, is a diagram illustrating a method for acknowledging high priority messages.
Figure 4B:
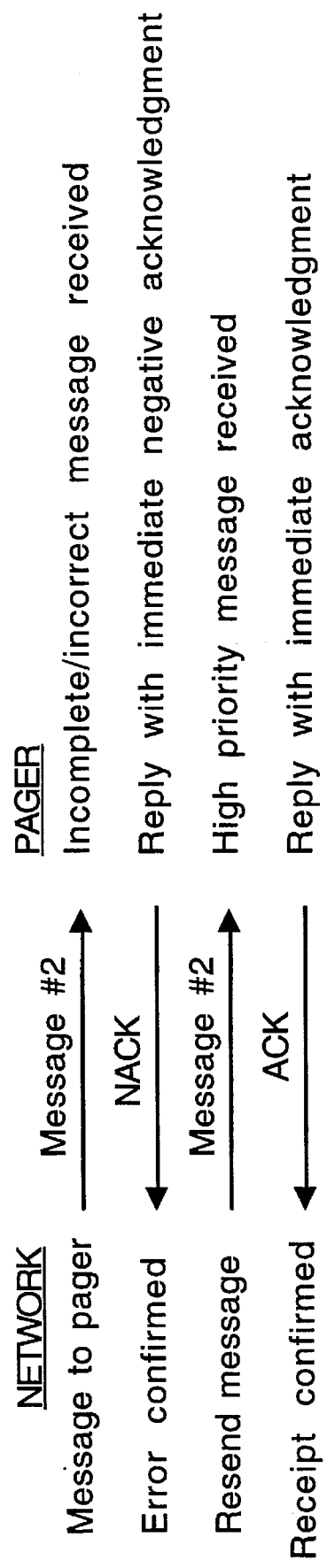
Figure 4C:
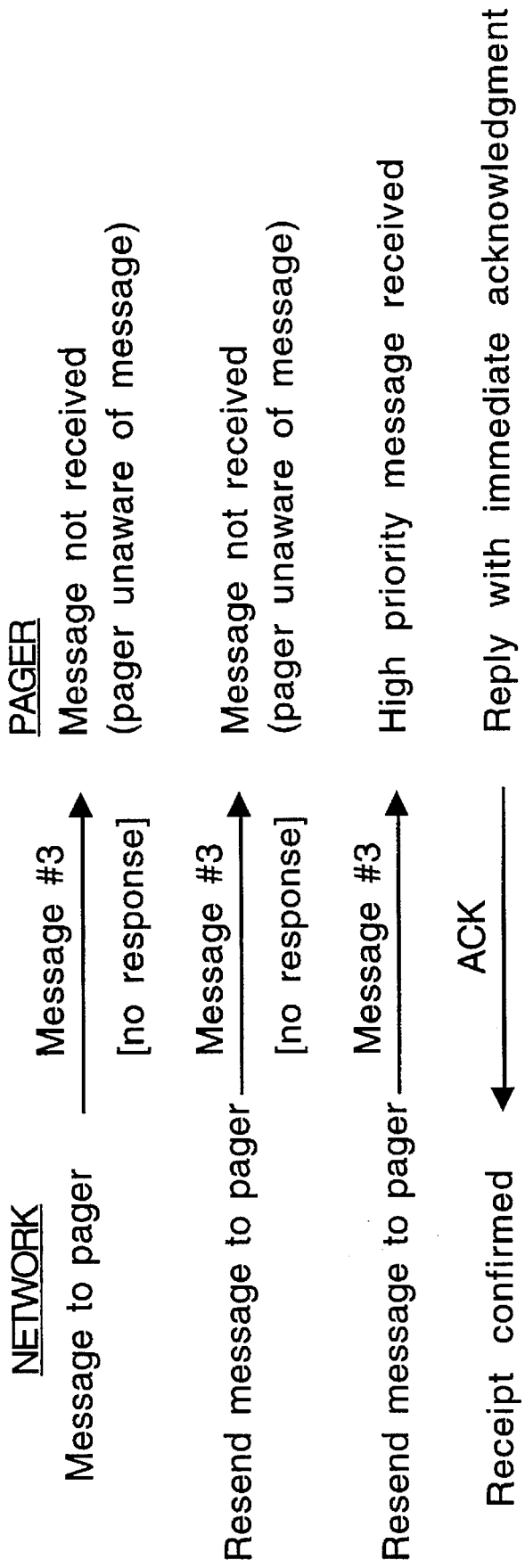

FIGS. 4A–4C illustrate the preferred method for handling high priority messages. In the preferred system, a pager will positively acknowledge each high priority message that is received from the paging network. The pager will determine whether the message received from the network is correct. Those skilled in the art will understand that this may be accomplished by checking a cyclic redundancy code (CRC) and forward error correction codes that are incorporated into the message by the network.

FIG. 4A illustrates the preferred method for acknowledging correctly received high priority messages. When a high priority message (message #1) is received correctly, the pager immediately transmits an acknowledgment (ACK) to the paging network. At that point, the network has confirmed that the message has been delivered to the pager. Once the delivery of a message has been confirmed, the message may be deleted or archived depending on the requirements of the paging system operator.

FIG. 4B illustrates the preferred method for handling garbled or incomplete messages. When the pager determines that the message (message #2) is incorrect or incomplete, the pager immediately transmits a negative acknowledgment (NACK) to the network. Upon receipt of the NACK, the network retransmits the message to the pager. If the retransmitted message is received correctly and is a high priority message, the pager immediately sends an ACK to the network. If the retransmitted message is incorrect or incomplete, the pager immediately sends another NACK. If the retransmitted message is received correctly and is a non-high priority message, the pager responds in the manner described below.

If the number of NACKs and retransmissions of a particular message exceed a predetermined retry limit, the network assumes that the pager is no longer in range of the system, and stores the message for retransmission at a later time or date.

FIG. 4C illustrates the paging network's response to a failure to receive a response to a high priority message. If the network sends a high priority message and fails to receive either an ACK or a NACK within a predetermined period of time, the network resends the message up to a predetermined number of retries. If the pager has actually received the message and sent an ACK that was not received by the network, this could result in multiple copies of the message being sent to the pager. In the preferred system, the pager maintains a list of received messages. When duplicates are received, the pager recognizes and discards the duplicate messages.

Non-critical Messages

In the preferred paging system, each message includes a message sequence number, which indicates the number and order of the messages sent to each pager in the system. The message sequence numbers are employed by the present invention to allow the pager to eventually acknowledge non-critical messages. The pager keeps track of the message sequence numbers of the messages it has received. If it determines that a message is missing, the pager automatically requests retransmission of the missing message.

As mentioned above, one-way paging networks are designed to provide high reliability with no acknowledgment of message receipt. Given the reliability of paging systems, the preferred system is designed to operate on the assumption that messages are normally received properly. For many types of transmissions, such as routine news, weather, traffic information, or advertising, a missed message may be acceptable. Therefore, it is not necessary for the pager to immediately recognize that it is has missed a message. Only when a message is detected as missing or garbled is a retransmission requested.

Figure 5:
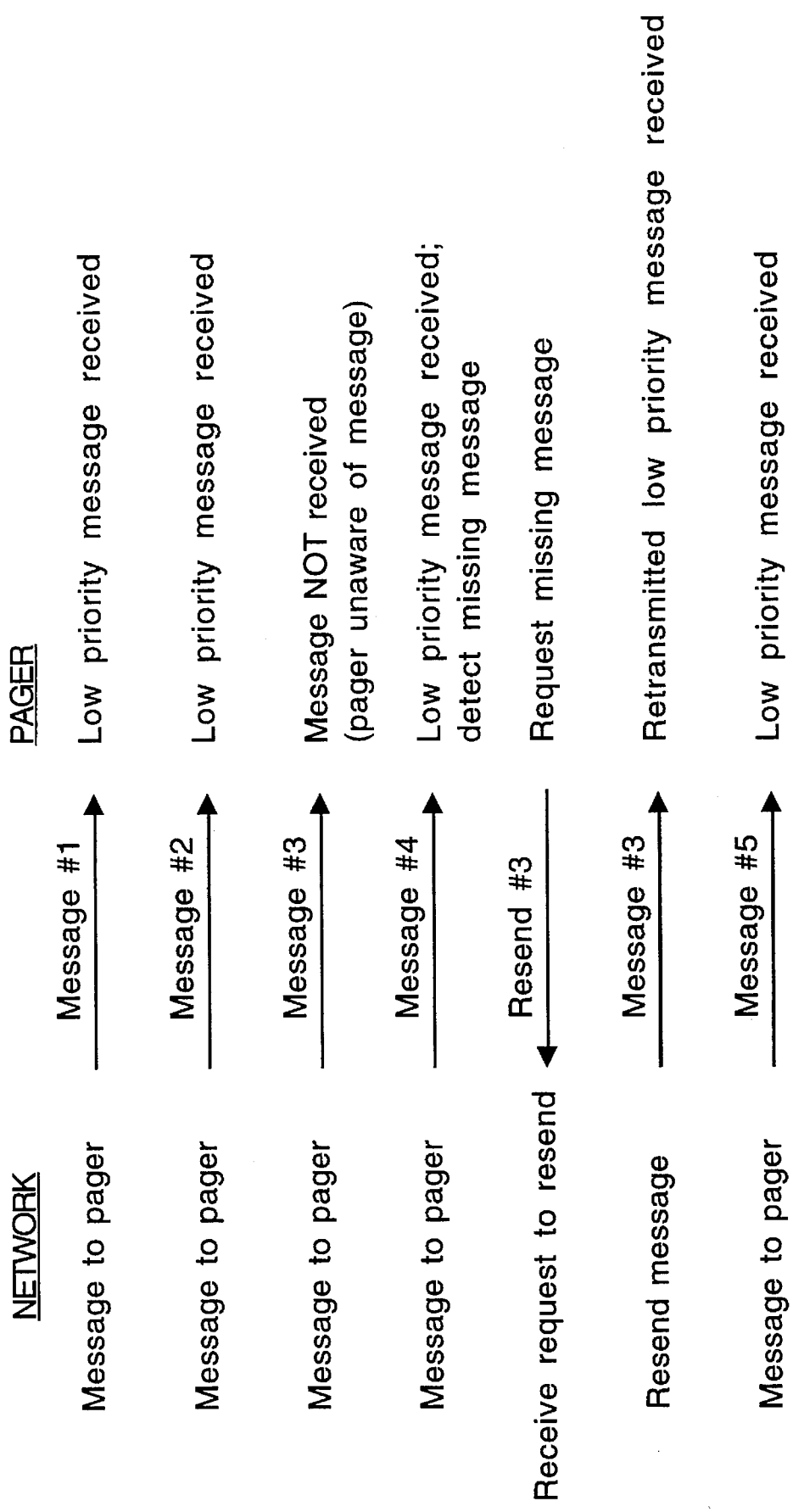
FIG. 5 is a diagram illustrating a method for using message sequence number to acknowledge low priority messages.

FIG. 5 illustrates the preferred method for using message sequence numbers to handle low priority messages. This illustrates how the protocol of the present invention is applied to reduce the number of times the pager's transmitter must be turned on to acknowledge a message.

In the illustration of FIG. 5, the pager correctly receives messages #1, #2 and #4. Because these are low priority messages, the pager does not send ACKs to the network. Message #3 was transmitted by the network, but was not received by the pager. Upon receiving message #4, the pager determines that message #3 is missing by checking received message sequence numbers. At that point, the pager sends a request to retransmit message #3, and message #3 is retransmitted by the network. Because message #3 is a low priority message, no ACK is sent by the pager. The next message, message #5, is properly received by the pager.

It is possible that the network will not receive the request to resend message #3. In the system of the present invention, this may be handled in one of two ways. In the first approach, the pager waits for a predetermined period of time after the request to resend message #3 is transmitted. If message #3 is not received within that time, the pager sends the request again, up to a maximum number of retries.

Alternatively, the pager may send the request to send message #3 only once after message #4 was received. Later, after message #5 is received from the network, the pager will check received message sequence numbers and determine that message #3 is still missing. At that point, the pager will send another request to the network to resend message #3. Those skilled in the art will understand that the pager maintains a sliding window that keeps track of the last block of n messages. If n=10, then the pager tracks up to 10 messages. By the time message #13 is received, the window slot for message #3 falls out of the window and is lost, and message #3 may never be recovered. The size of the value n can be set to assure reliable operation over typical usage of the paging system. The sliding window technique is the preferred method because it minimizes transmissions by the pager, thereby reducing battery power consumption.

Those skilled in the art will appreciate that the foregoing method of detecting missing messages is dependent upon someone sending at least one subsequent, successfully delivered message to a pager after the missed page. If a pager does not receive another page for the rest of the day, for example, the pager would not know that it missed a page. Thus, the previously described technique is effective in a two-way system that generates relatively frequent transmissions to each user (or to a group of users). However, the previously described approach may result in missing messages for "low traffic" pagers.

The priority-based protocol of the present invention overcomes this problem by utilizing periodic administrative messages called "ping packets" in conjunction with the message sequence numbers. Ping packets are used to ensure that missing messages are detected by the pager within a predetermined period of time. Generally described, a paging network embodying the present invention periodically sends ping packets to each pager. The ping packets include data indicating the message sequence number that will be assigned to the next message sent to the pager. If the pager determines that it has received all of the previous messages, it remains silent. However, if the pager determines that it is has missed an earlier message, it will transmit to the paging network a request to resend the missing packet.

Figure 6A:
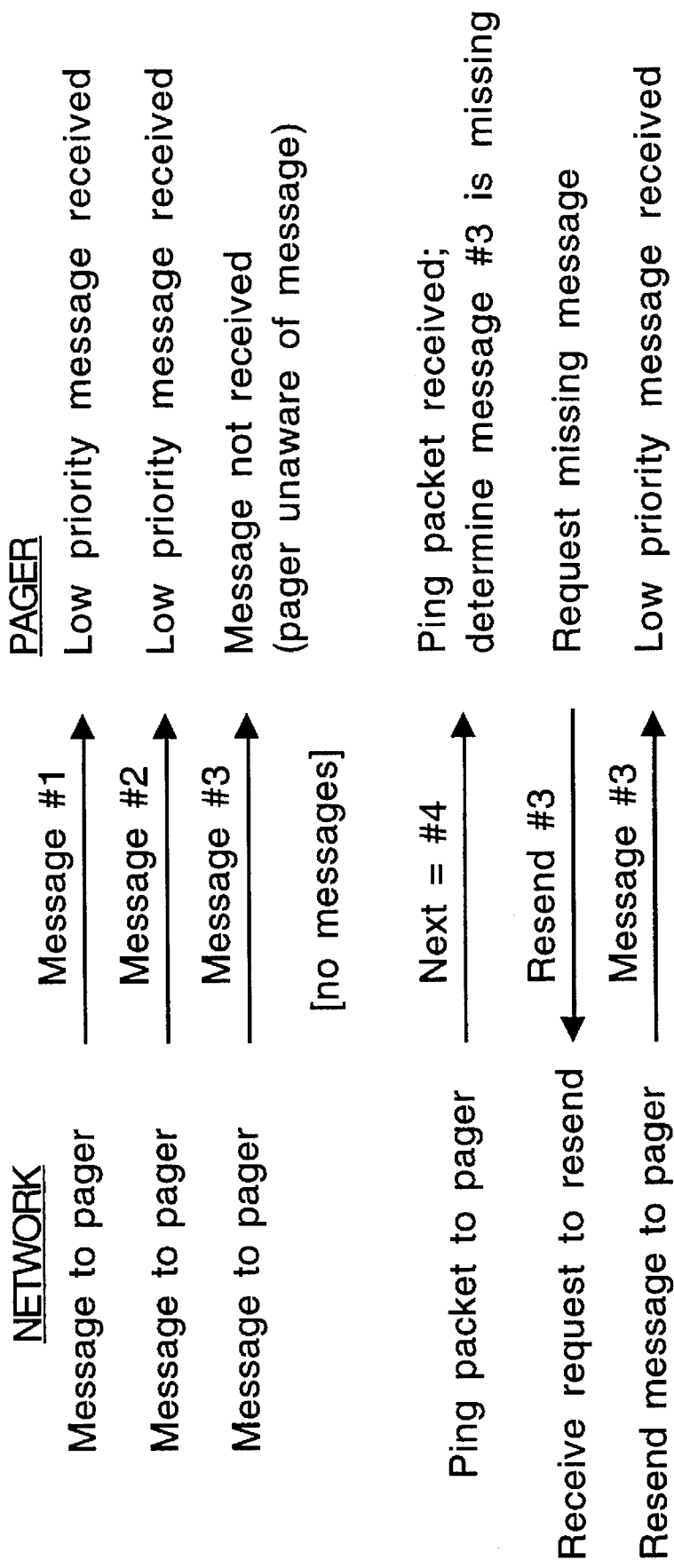
FIG. 6, consisting of FIGS. 6A and 6B, is a diagram illustrating a method for using ping packets to acknowledge low priority messages.

FIG. 6A illustrates the use of ping packets that are transmitted by the paging network. In the example of FIG. 6A, low priority messages #1 and #2 are received correctly, and are not acknowledged. Message #3 is transmitted by the paging network, but is not received by the pager. After a predetermined period of time has elapsed without a new message being sent to the pager, the network transmits a ping packet indicating that the next message sent to the pager will be message #4. The pager uses the information in the ping packet to determine that message #3 was not received, and requests that message #3 be resent. The network then retransmits message #3.

Those skilled in the art will appreciate that in an alternative embodiment, the pagers could be programmed to send ping packets to the network after a predetermined period of time has elapsed. This method is illustrated in FIG. 6B.

Figure 6B:
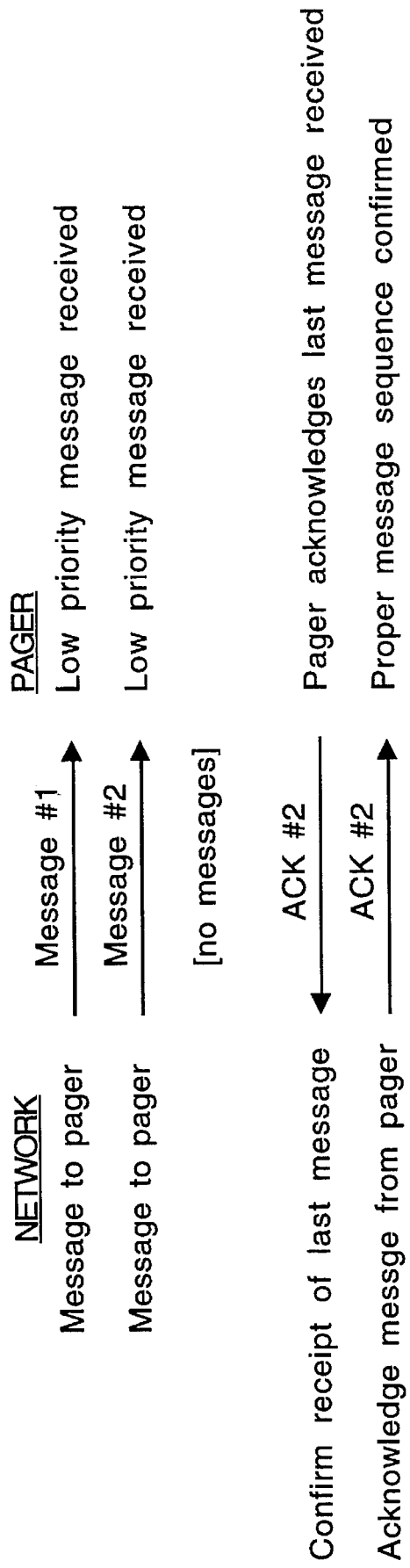

In FIG. 6B, low priority messages #1 and #2 are received correctly, and are not acknowledged. After a predetermined period of time has elapsed without another message being received, the pager sends a ping packet indicating that the last message it received as message #2. If that is correct, the network will acknowledge the ping packet from the pager. If the network determines that the pager has failed to receive messages, the network would respond by retransmitting the missing messages.

Although the present invention may be implemented by programming the pagers to transmit the ping packets, those skilled in the art will appreciate that this causes the pagers to transmit more messages than the method illustrated in FIG. 6A, in which the ping packets are transmitted by the network.

From the foregoing examples, those skilled in the art will appreciate that the result of using ping packets in conjunction with message sequence numbers is to significantly increase the life a two-way pager's battery, thus enabling portable computers and other paging devices to operate for longer periods without requiring the batteries to be replaced or recharged. This reduction in battery power consumption is achieved while ensuring that missing messages will be detected by the pager within a predetermined period of time.

Use of Multiple Priority Levels

The priority based protocol of the present invention is not limited to high and low priority levels as described above. Instead, the priority levels could be assigned a numeric value, such as 0, 1, 2, 3, etc., which would determined how quickly ping packets are sent. A priority value of 0 is the highest priority, and indicates to the pager that the message must be acknowledged immediately. A priority level of 1 means that the paging network (or the pager) may wait up to 1 hour before sending a ping packet to ensure that the message has been received. A priority level of 2 means to wait up to 2 hours, and so on. Therefore, a substantial number of priority levels may be assigned to messages.

Use of Piggybacked Acknowledgments

In addition to transmitting ACKs and NACKs in the manner described above, the hand held computer 50 of FIG. 3 may be used to originate electronic mail messages, or to prepare replies to electronic mail messages received from the paging network. In the priority based protocol of the present invention, high priority messages will be immediately sent to the network. However, non-critical messages will be stored in the hand held computer until another message is being transmitted from the pager to the paging network. In addition, the user may set a time limit by which the message must be sent. If the time limit expires, the message will be sent without regard to other messages being transmitted from the pager to the network. These aspect of the present invention are illustrated in FIG. 7.

Figure 7:
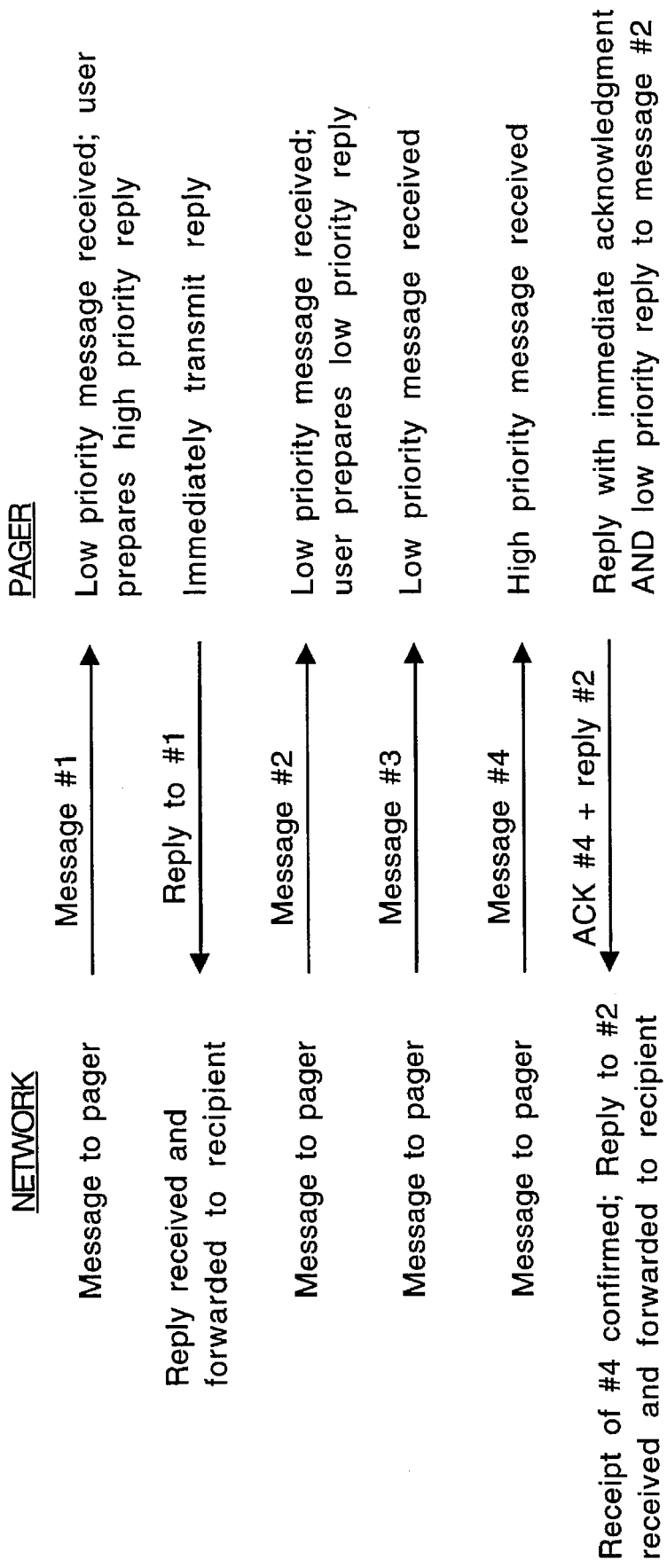
FIG. 7 is a diagram illustrating a method for piggybacking messages and acknowledgments.

In the example of FIG. 7, the pager receives message #1, which may include an inquiry such as whether the recipient will be back to the office in time for a lunch appointment. Because the reply must be delivered before lunch, the user prepares a response indicating whether he will be there for the appointment, and marks the response as urgent. The urgent response is immediately transmitted from the pager to the paging network, and delivered to the sender of the original message.

The pager later receives message #2, which includes an inquiry about whether the recipient will be attending a meeting that is scheduled to take place the following month. Because the meeting is several weeks away, it is not necessary to reply immediately. Therefore, the user prepares a reply and indicates that it is a low priority message, which may be piggybacked with another message that is being sent from the pager to the network.

Later, the pager receives low priority message #3, and does not respond by sending an ACK. When high priority message #4 is received, the pager prepares an ACK, and also includes the reply to message #2 in the ACK message.

Using this method, the number of times the pager's transmitter must be activated is minimized and the amount of "overhead" is reduced when compared to the amount of overhead that would be required to send two separate messages.

Those skilled in the art will appreciate that messages from the pager can be combined in other ways without departing from the scope of the present invention. For example, the response to message #2 could indicate that it needs to be sent within a predetermined time, regardless of other transmissions between the pager and network. Likewise, the response to message #2 could have been combined with a request to resend a missed message. Alternatively, when the pager sends the response to message #2, it could determine that other messages were missed, and include a request to send the missing messages.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for operating a message receiver, said message receiver operative for receiving data from and transmitting data to a message distribution network, comprising the steps of:

receiving a first message from said message distribution network, said first message including a first message sequence number;

accepting a reply message associated with said first message:

determining whether said reply message is a high priority reply;

in response to said reply message being a high priority reply, transmitting said reply message to said message distribution network, otherwise, storing said reply message;

receiving a second message from said message distribution network, said second message including a second message sequence number;

determining whether there is a missing message sequence number between said first message sequence number and said second message sequence number;

in response to a determination that there is a missing sequence number, transmitting to said message distribution network a request to resend a message corresponding to said missing message sequence number;

transmitting said stored reply message with said request to resend a message; and receiving from said message distribution network said message corresponding to said missing message sequence number.

2. A method for operating a message receiver as recited in claim 1, further comprising the steps of:

determining whether said second message is incorrect; and transmitting a negative acknowledgment to said message distribution network if said second message is incorrect.

3. A method for operating a message receiver as recited in claim 2, further comprising the steps of:

transmitting said stored reply message with said negative acknowledgment.

4. A method for operating a message receiver as recited in claim 1, wherein said first message includes priority indicia indicative of the priority of said first message; and further comprising the steps of:

determining whether said priority indicia indicates said second message is a high priority message; and transmitting an acknowledgment to said message distribution network if said second message is a high priority message.

5. A method for operating a message receiver as recited in claim 4, further comprising the steps of:

transmitting said stored reply message with said acknowledgment.

6. A method for operating a message receiver as recited in claim 1, further comprising the steps of:

prior to receiving said message corresponding to said missing message sequence number, determining whether a predetermined amount of time has elapsed since said request to resend said message was transmitted; and if said predetermined amount of time has elapsed, retransmitting said request to resend said message corresponding to said missing message sequence number.

7. A method for operating a message receiver, said message receiver operative for receiving data from and transmitting data to a message distribution network, comprising the steps of:

receiving a plurality of messages from said message distribution network, each of said messages including a message sequence number corresponding to the order in which said messages were transmitted by said message distribution network;

storing said message sequence numbers;

accepting a reply message associated with one of said plurality of messages;

determining whether said reply message is a high priority reply:

in response to said reply message being a high priority reply, transmitting said reply message to said message distribution network, otherwise, storing said reply message;

receiving a subsequent message from said message distribution network, said subsequent message including a corresponding message sequence number;

determining whether said message sequence numbers indicate that a transmitted message has not been received by said message receiver;

in response to a determination that a transmitted message has not been received, transmitting to said message distribution network a request to resend a message corresponding to a missing message sequence number;

transmitting said stored reply message with said request to resend a message; and receiving from said message distribution network said message corresponding to said missing message sequence number.

8. A method for operating a message receiver as recited in claim 7, further comprising the steps of:

for each of said plurality of messages, determining whether said message is incorrect; and transmitting a negative acknowledgment to said message distribution network for each of said incorrect messages.

9. A method for operating a message receiver as recited in claim 8, further comprising the steps of:

transmitting said stored reply message with said negative acknowledgment.

10. A method for operating a message receiver as recited in claim 7, wherein each of said plurality of messages includes priority indicia indicative of the priority of each of said messages; and further comprising the steps of:

for each of said plurality of messages, determining whether said plurality of message is a high priority message; and transmitting an acknowledgment to said message distribution network subsequent to receipt of a high priority message.

11. A method for operating a message receiver as recited in claim 10, further comprising the steps of:

transmitting said stored reply message with said acknowledgment.

12. A method for operating a message receiver as recited in claim 7, further comprising the steps of:

prior to receiving said message corresponding to said missing message sequence number, determining whether a predetermined amount of time has elapsed since said request to resend said message was transmitted; and if said predetermined amount of time has elapsed, retransmitting said request to resend said message corresponding to said missing message sequence number.

13. A method for operating a message distribution network, said message distribution network being operative for transmitting data to and receiving data from a message receiver, comprising the steps of:

transmitting a first message to said message receiver, said first message including a first message sequence number;

transmitting a second message to said message receiver, said second message including a second message sequence number;

transmitting a ping packet to said message receiver, said ping packet including data indicating the message sequence number that will be assigned to the next message sent to the pager, said ping packet being transmitted at a predetermined period of time subsequent to said second message;

subsequent to transmitting said ping packet, receiving from said message receiver a request to resend said second message; and retransmitting said second message to said message receiver.

14. A two-way data messaging system, comprising:

a message distribution network; and a message receiver;

said message distribution network being configured to:

transmit a plurality of messages to said message receiver, each of said messages including a corresponding message sequence number corresponding to the order in which said messages are transmitted by said message distribution network;

transmit a ping packet to said message receiver, said ping packet indicating the message number of the last of said plurality of messages, said ping packet being transmitted after a predetermined amount of time has elapsed since the transmission of the last of the plurality of messages;

receive from said message receiver a response requesting retransmission of one of said plurality of messages corresponding to a missing message sequence number;

retransmit said one of said plurality of messages corresponding to said missing message sequence number; and said message receiver being configured to:

receive said plurality of messages from said message distribution network;

receive said ping packet from said message distribution network;

determine whether at least one of said plurality of messages was not received;

transmit said response requesting retransmission of said one of said plurality of messages corresponding to said missing message sequence number;

receive said one of said plurality of messages corresponding to said missing message sequence number.

15. A two-way data messaging system as recited in claim 14, wherein said predetermined mount of time is determined by a priority level associated with said last of said plurality of messages.

16. A two-way data messaging system as recited in claim 14, wherein said message receiver is further operative to:

for each of said plurality of messages, determine whether said message is incorrect; and transmit a negative acknowledgment to said message distribution network for each of said incorrect messages.

17. A two-way data messaging system as recited in claim 14, wherein each of said plurality of messages includes priority indicia indicative of the priority of each of said messages; and wherein said message receiver is further operative to:

for each of said plurality of messages, determine whether said plurality of message is a high priority message; and transmit an acknowledgment to said message distribution network subsequent to receipt of a high priority message.

18. A two-way data messaging system as recited in claim 14, wherein said ping packet indicates the message sequence number immediately subsequent to the message sequence number associated with the last of said plurality of messages.

19. A two-way data messaging system, comprising:

a message distribution network; and a message receiver;

said message distribution network being configured to:

transmit a plurality of messages to said message receiver, each of said messages including a corresponding message sequence number corresponding to the order in which said messages are transmitted by said message distribution network;

receive a ping packet from said message receiver, said ping packet indicating the message number of the last of said plurality of messages;

determine whether said ping packet corresponds to the last of said plurality of messages;

transmit an acknowledgment if said ping packet corresponds to the last of said plurality of messages; and transmit a missing message if said ping packet does not correspond to the last of said plurality of messages; and said message receiver being configured to:

receive said plurality of messages from said message distribution network;

transmit said ping packet to said message distribution network, said ping packet being transmitted after a predetermined amount of time has elapsed since the receipt of the last of said plurality of messages received by said message receiver;

receive said acknowledgment from said message distribution network; and receive said missing message from said message distribution network.

20. A two-way data messaging system as recited in claim 19, wherein said predetermined amount of time is determined by a priority level associated with said last of said plurality of messages.

21. A two-way data messaging system as recited in claim 19, wherein said message receiver is further operative to:

for each of said plurality of messages, determine whether said message is incorrect; and transmit a negative acknowledgment to said message distribution network for each of said incorrect messages.

22. A two-way data messaging system as recited in claim 19, wherein each of said plurality of messages includes priority indicia indicative of the priority of each of said messages; and wherein said message receiver is further operative to:

for each of said plurality of messages, determine whether said plurality of message is a high priority message; and transmit an acknowledgment to said message distribution network subsequent to receipt of a high priority message.

23. A two-way data messaging system as recited in claim 19, wherein said ping packet indicates the message sequence number immediately subsequent to the message sequence number associated with the last of said plurality of messages.

24. A method for operating a message receiver, comprising the steps of:

receiving a plurality of messages from a message distribution network, said plurality of messages each including a message sequence number;

receiving a ping packet from said message distribution network, said ping packet corresponding to the last message transmitted by said message distribution network, said ping packet being transmitted after a predetermined amount of time has elapsed since the receipt of the last of said plurality of messages received by said message receiver;

determining whether said ping packet corresponds to a last one of said plurality of messages;

if said ping packet does not correspond to said last one of said plurality of messages, transmitting to said message distribution network a request for a missing message; and receiving said missing message.

25. A method for operating a message receiver as recited in claim 24, further comprising the steps of:

storing a reply to one of said plurality of messages; and incorporating said reply into said ping packet.

26. A method for operating a message receiver as recited in claim 24, further comprising the steps of:

for each of said plurality of messages, determining whether said message is incorrect; and transmitting a negative acknowledgment to said message distribution network for each of said incorrect messages.

27. A method for operating a message receiver as recited in claim 26, further comprising the steps of:

storing a reply to one of said plurality of messages; and incorporating said reply into said negative acknowledgment.

28. A method for operating a message receiver as recited in claim 24, wherein each of said plurality of messages includes priority indicia indicative of the priority of each of said messages; and further comprising the steps of:

for each of said plurality of messages, determining whether said plurality of message is a high priority message; and transmitting an acknowledgment to said message distribution network subsequent to receipt of a high priority message.

29. A method for operating a message receiver as recited in claim 28, further comprising the steps of:

storing a reply to one of said plurality of messages; and incorporating said reply into said acknowledgment.

\* \* \* \* \*